United States Patent [19]

Link et al.

[11] Patent Number: 4,658,621
[45] Date of Patent: Apr. 21, 1987

[54] ROLLING APPARATUS

[75] Inventors: Christoph Link, Weingarten; Herbert Brandiser, Mochenwangen, both of Fed. Rep. of Germany

[73] Assignee: Sulzer-Escher Wyss AG, Zürich, Switzerland

[21] Appl. No.: 677,571

[22] Filed: Dec. 3, 1984

[30] Foreign Application Priority Data

Dec. 22, 1983 [CH] Switzerland ............... 6844/83

[51] Int. Cl.⁴ .................. B21B 13/14; B21B 31/16
[52] U.S. Cl. .................... 72/243; 29/116 AD; 72/237; 72/245; 100/162 B
[58] Field of Search ........... 72/243, 245, 20, 237; 29/116 AD, 116 R, 113 AD, 113 R; 100/162 B

[56] References Cited

U.S. PATENT DOCUMENTS 3,097,590  7/1963  Justus ................ 29/116 AD
3,097,591  7/1963  Justus ................ 29/116 AD
3,885,283  5/1975  Biondetti ............. 29/116 AD
4,167,964  9/1979  Flury ............... 29/116 AD X

FOREIGN PATENT DOCUMENTS 5835  2/1965  Japan ................ 100/162 B

Primary Examiner—Robert L. Spruill
Assistant Examiner—Steve Katz
Attorney, Agent, or Firm—Werner W. Kleeman

[57]  ABSTRACT

The rolling apparatus contains a controlled deflection roll and, in order to improve uniformity of the roll nip or gap or to more precisely maintain a desired rolling profile, a counter roll contains a journal-less tubular roll or shell which is articulatedly supported at a support beam or at supports of a roll stand. The support distance of the counter roll at the most is equal to the effective support distance in the controlled deflection roll. The bending lines of the controlled deflection roll and of the counter roll thus can be matched in an improved manner.

18 Claims, 3 Drawing Figures

ROLLING APPARATUS

BACKGROUND OF THE INVENTION

The present invention relates to a new and improved construction of rolling apparatus or rolling mill.

In its more particular aspects, the present invention relates to a new and improved rolling apparatus comprising a controlled deflection roll which contains a non-rotatable or stationary support or beam and a roll shell which is rotatable about this stationary support or beam and which is supported along its length at such stationary support or beam. The rolling apparatus further comprises a counter roll containing supporting means which are arranged in such a manner as to face a supporting means for supporting the roll shell at the stationary support or beam of the controlled deflection roll.

Such rolling apparatus as known, for example, from U.S. Pat. No. 3,119,324, granted Jan. 28, 1964, or Swiss Pat. No. 623,369, granted May 29, 1981, serve, for instance, for dewatering, calendering or other treatment of web-shaped materials like plastics, paper, cardboard or textile material and can also be utilized for rolling metal foils or bands. Controlled deflection rolls, by means of which the pressing force effective between two rolls can be adjusted or balanced over the width of the rolls, have been found particularly suited for such purposes in order to achieve, across the width of the treated web of material, a treatment which is especially uniform, which can be adapted to the requirements or which can compensate for defective roll profiles. It is a prerequisite for achieving this objective that the roll nip or gap existing between the controlled deflection roll and the counter roll corresponds, across the entire width, as precisely as possible to the desired profile and in particular cases, for example, can be maintained constant. Since, however, the pressing rolls are of different constructions in most cases, the bending lines of the two rolls do not have the same shape and there results, as a consequence, a non-uniform roll nip or gap. While a large portion of such non-uniformity can be compensated for by using different pressing forces in different zones of the controlled deflection roll, nevertheless such significantly restricts the useful efficiency of the zone control.

As already described in the previously mentioned Swiss Pat. No. 623,369, the aforementioned deviations can be greatly reduced and the bending lines of the controlled deflection roll and of the counter roll can be better matched or accommodated to one another when the supporting means for the roll shell at the support or beam of the controlled deflection roll and the supporting means for the journals of the counter roll are arranged in the roll stand of the rolling apparatus in such a manner as to face each other and to be equidistant. In such arrangement the journals of the counter roll which may be designed as a solid roll or as a tubular roll, are fixedly connected with the roll body and rotate conjointly therewith. The practical utilization of this concept, however, is very limited since the spatial conditions, particularly for the arrangement of the various supporting means, require a special roll stand and additionally prevent or exclude the improvement of existing rolling mill or apparatus by reconstruction or retrofitting.

While the aforementioned problems may be solved by using two similar controlled deflection rolls which counteract each other, such solution, however, would require in practice that the constructional expense and the costs are doubled, apart from the necessity of using complicated control means.

SUMMARY OF THE INVENTION

Therefore, with the foregoing in mind it is a primary object of the present invention to provide a new and improved rolling apparatus or mill which is not afflicted with the aforementioned drawbacks and limitations of the prior art constructions heretofore discussed.

Another and more specific object of the present invention is directed to the provision of a new and improved rolling apparatus containing only one controlled deflection roll and further designed in such a manner that an improved matching or accommodation of the bending lines of the two rolls and a reduction in the deviations at the roll nip or gap can be achieved in a simple manner also in existing rolling apparatus or mills.

Still a further significant object of the present invention is directed to a new and improved construction of a rolling apparatus or mill containing only one controlled deflection roll and further designed in such a manner that a desired roll nip or gap profile can be more precisely adjusted and maintained across the rolling width.

Now in order to implement these and still further objects of the invention, which will become more readily apparent as the description proceeds, the rolling apparatus of the present development is manifested by the features that, the counter roll comprises a journal-less tubular roll or shell the supporting means of which only comprise two articulatedly constructed bearing supports.

Rolls comprising a journal-less tubular roll or shell which is supported only by two articulatedly constructed bearing supports at a yoke or at supports of a roll stand, are already known from U.S. Pat. No. 3,097,590, granted July 16, 1963 and U.S. Pat. No. 3,097,591, granted July 16, 1963. However, there cannot be obtained any teachings from these publications that such rolls in cooperation with a controlled deflection roll permit achieving a better matching or accommodation of the bending lines of the two rolls and thereby a better adaptation of the roll nip or gap between the two rolls to a desired profile, for example, an improved uniformity of the roll nip or gap over the roll width.

Advantageously, the support distance of the supporting means of the counter roll in the inventive rolling apparatus is of the same order of magnitude or smaller than the effective support distance of the roll shell in the controlled deflection roll.

In an advantageous construction of the inventive rolling apparatus the counter roll may comprise a through-passing support beam which either is rotatable conjointly with the tubular roll or shell, in which case the tubular roll or shell is supported at the support beam by means of articulatedly constructed ball-bearing supports, or the support beam is stationary and the tubular roll or shell is supported thereat by means of roller bearing supports, for example, pivot bearings.

The roll shell of the controlled deflection roll may also be supported in a manner known as such by means of roller bearings, for example, pivot bearings at the associated support or beam. The roll shell can also be freely displaceable in radial direction, for example, by using cam guide means or the like at its two ends, in which case the two outermost support elements between the roll shell and the support or beam would be considered as the effective supporting means.

The support of the roll shell in the controlled deflection roll at the support or beam thereof can be constructed in any known manner and may be formed, for example, by hydrostatic or hydrodynamic support or pressure elements, by hydraulic or pneumatic pressure chambers, or may also be formed by rollers or support shoes which are mechanically, magnetically, electrically, hydraulically, or pneumatically pressed. In such arrangement the support or pressure elements are controlled in any suitable manner which is known or obvious to a person skilled in the art.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
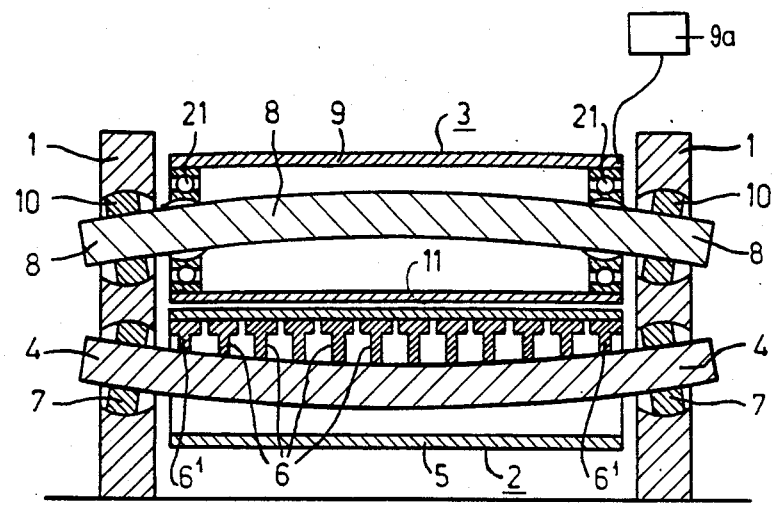
FIG. 1 is a sectional view of a first embodiment of a rolling apparatus or mill according to the invention with a counter roll containing a non-rotatable support beam.

Describing now the drawings, it is to be understood that only enough of the construction of the rolling apparatus or mill has been shown as needed for those skilled in the art to readily understand the underlying principles and concepts of the present development, while simplifying the showing of the drawings. Turning attention now specifically to FIG. 1, there has been represented therein a sectional view of a first exemplary embodiment of the inventive rolling apparatus or mill which contains a roll stand 1 at which two rolls 2 and 3 are mounted. The lower roll 2 is designed as a controlled deflection roll as known, for example, from U.S. Pat. No. 3,885,283, granted May 27, 1975, or U.S. Pat. No. 3,802,044, granted Apr. 9, 1974. The lower roll or controlled deflection roll 2 comprises a stationary or non-rotatable roll support or beam 4 and a roll shell 5 which is rotatable about the roll support or beam 4 and which is supported in a pressing direction at the roll support or beam 4 by supporting means which, in the illustrated exemplary embodiment, comprise a plurality or series of hydrostatic support or pressure elements 6. The roll support or beam 4 is mounted at its two ends in the roll stand 1 by means of a related spherical bearing support 7 or by means of any other appropriate articulatedly constructed bearing support. A bending-through or sag of the roll support or beam 4 is thus enabled. In the case that there is not desired too large a bending-through or sag under the action of the pressing forces, a non-bendable mounting can also be provided such as known, for example, from U.S. Pat. No. 4,414,889, granted Nov. 15, 1983.

The roll shell 5 is rotatable about the roll support or beam 4 and is freely displaceable in a radial direction. In the illustrated embodiment the pressing force is generated only by the plurality or series of pressure or support elements 6 which are arranged in the lengthwise direction of the controlled deflection roll 2. Such pressure or support elements 6 are known, for example, from the previously mentioned U.S. Pat. No. 3,885,283. A transverse displacement can be prevented in such arrangement by means of a cam guide arrangement. Instead the roll shell 5, however, can also be supported at the roll support or beam 4 by means of a pivot bearing in accordance with the previously mentioned U.S. Pat. No. 3,802,044. In this arrangement engagement means for the rolls can be provided in order to generate the pressing force. The drive means for the controlled deflection roll 2 can be designed, for example, as in U.S. Pat. No. 3,949,455, granted Apr. 13, 1976, or in any other appropriate manner.

The counter roll 3 comprises a stationary or non-rotatable support beam 8 and a tubular roll or shell 9 which is rotatable or may be driven to rotate about the support beam 8 by drive means 9a. The latter is also mounted in the roll stand 1 by means of a spherical bearing support 10 or by non-bendable mounting means. The rotatable tubular roll or shell 9 is articulatedly supported at the associated support beam 8, for example, by means of two universal bearing supports or bearing supports 21 which articulatedly support the tubular roll or shell 9 and which may be designed as roller bearings or, preferably, as pivot bearings.

The two bearing supports 21 articulatedly supporting the tubular roll or shell 9 are arranged and the supporting means supporting the roll shell 5 of the controlled deflection roll 2 at the non-rotatable roll support or beam 4 thereof are arranged in an essentially mutually opposing relationship. The roll shell 5 in the controlled deflection roll 2 possesses a predetermined axial length and is displaceable over its entire length in the aforementioned pressing direction. The tubular roll or shell 9 of the counter roll 3 possesses a predetermined axial length and defines a radial direction. This tubular roll or shell 9 is displaceable over its entire axial length in the radial direction at least in pressing direction.

In the rolling apparatus as described hereinbefore there is obtained a surprisingly good conformity between the bending lines of both differently structured controlled deflection roll 2 and counter roll 3. As a result there is also obtained a corresponding extremely good uniformity of the roll nip or gap 11 or, in the case of an appropriate control of the individual pressure or support elements 6, an exact maintenance of a desired rolling profile. This advantage is achieved in this arrangement in a particularly simple manner without the necessity of having to carry out considerable modifications in existing roll stands. Consequently, the retrofitting or reconstruction of such roll stands in order to achieve an improved roll nip or gap uniformity is thus possible without any great difficulties and without considerable expense.

Figure 2:
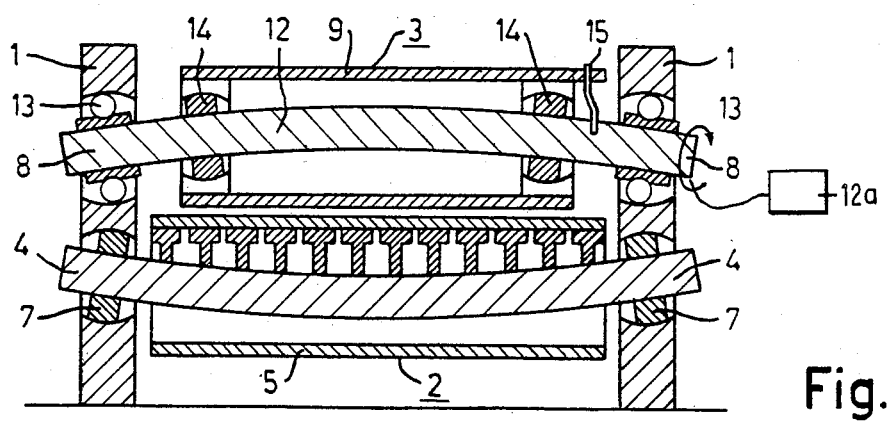
FIG. 2 is a sectional view of a second embodiment of the inventive rolling apparatus or mill with a counter roll containing a rotatable support beam.

The second exemplary embodiment of the inventive rolling apparatus or mill as represented in a sectional view in FIG. 2 differs from the exemplary embodiment as described hereinbefore with reference to FIG. 1 in that the counter roll 3 comprises a tubular roll or shell 9 and a rotatable support beam 12 which is journaled conjointly with the tubular roll or shell 9 in the roll stand 1 by means of roller bearings 13 or, preferably, pivot bearings. The tubular roll or shell 9 is articulatedly supported at the support beam 12 in a spherical bearing support 14. In order to ensure synchronous rotation of the tubular roll or shell 9 and the support beam 12, any suitable entrainment member 15 is provided between the two members 9 and 12. The rolling apparatus of this type is driven by means of the controlled deflection roll 2, however, may also be driven via the support beam 12 by conventional and therefore only schematically illustrated drive means 12 a.

In the third exemplary embodiment of the inventive rolling apparatus the counter roll 3, contrary to the precedingly described embodiments, is not provided with an actual support beam but is articulatedly supported with both its ends at related support members 16 which extend from related ones of two sides of the roll stand 1. The articulation is achieved due to the fact that, at the ends of the support members 16, there are provided related spherically-shaped members 17 at which related support shoes 18 are supported. The tubular roll or shell 9 is movably or resiliently supported at these support shoes 18, so that the tubular roll or shell 9 is freely displaceable in radial direction. The head members or spherically-shaped members 17 of the two support members 16 additionally can be interconnected by a stabilizing rod 19 which takes up the tensional forces occurring during the operation of the rolling apparatus and thus serves a stabilizing purpose. Since the tubular roll or shell 9 in this exemplary embodiment is radially displaceable, the roll shell 5 of the controlled deflection roll 2 can be supported at the related roll support or beam 4 by means of roller bearings 20 which preferably are designed as pivot or pendulum bearings.

There results in all the exemplary embodiments described hereinbefore a significantly improved conformity of the bending lines of the controlled deflection roll 2 and of the counter roll 3, provided that the counter roll 3 contains an articulatedly supported tubular roll or shell 9 and that additionally the support distance of the counter roll 3 is approximately equal to the support distance of the roll shell 5 of the controlled deflection roll 2 or is at least of the same order of magnitude. When the supporting means of the two rolls are appropriately selected, an improvement also results when the support distance of the counter roll 3 is smaller than the support distance in the controlled deflection roll 2.

The support distance of the counter roll 3 in these arrangements is defined by the spacing between the two articulatedly constructed bearing supports 14, 18, or 21 of the tubular roll or shell 9. When, in the controlled deflection roll 2, the supporting means are designed as roller bearings, the support distance of the roll shell 5 of such controlled deflection roll 2 must be regarded as the spacing of the centers of such roller bearings 20. When, however, the roll shell 5 of the controlled deflection roll 2 is solely supported by the pressure or support elements 6, approximately the distance of the outermost pressure or support elements $6^1$ which exert a pressing force must be considered as the effective support distance and pressure or support elements 6 which are not subjected to pressure are neglected in this consideration.

Figure 3:
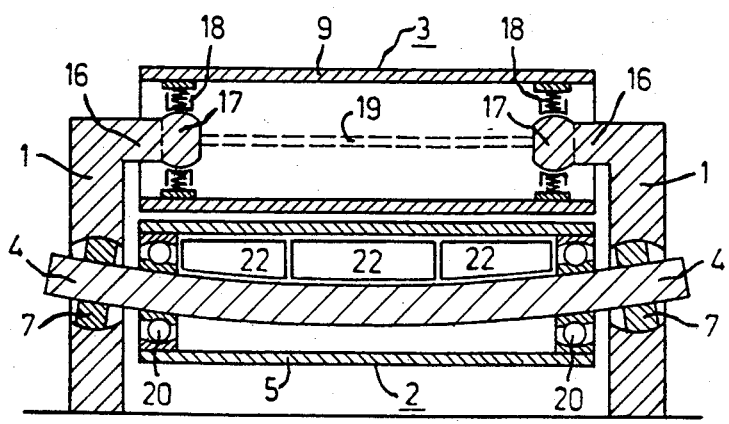
FIG. 3 is a sectional view of a third embodiment of the inventive rolling apparatus or mill with a counter roll which is supported at two support members of a roll stand.

It is noted that the invention is not limited to the exemplary embodiments described hereinbefore, but that modifications thereof are possible without departing from the scope of the inventive concepts. Thus, it can be preferable in the controlled deflection roll 2 to utilize other supporting means than the hydrostatic pressure or support elements 6. Instead there can also be used supporting means of a different type such as, for example, hydrodynamic, roller bearing or electromagnetic supporting means or one or more pressure chambers 22 which are arranged between the roll shell 5 and the roll support or beam 4, i.e. a so-called floating roll arrangement of the kind as illustrated in FIG. 3. Furthermore, additional pressure or support elements or pressure chambers can be provided which act in a direction opposite to the pressing direction. Also, various types of support elements can be simultaneously employed in combination at the same roll.

The supporting means for the tubular roll or shell 9 of the counter roll 3 may also be differently structured provided that such supporting means are of a sufficiently articulatedly constructed design and the support distance satisfies the aforementioned requirements.

Furthermore, the invention is not limited to a specific spatial orientation of the rolls or to a rolling apparatus or mill containing just two rolls. The controlled deflection roll may also assume the top position and the orientation may also be at an inclination or horizontally.

The rolling apparatus may also comprise more than two rolls provided one of such rolls is designed as a controlled deflection roll and the counter roll is structured and arranged in accordance with the invention. In the case of more than two rolls it is of advantage when not only the one counter roll but all the remaining rolls are constructed in accordance with the invention in such a manner as to contain a journal-less tubular roll or shell with supporting means consisting only of two articulatedly constructed bearing supports.

For certain applications the counter roll 3, furthermore, can also be constructed to be heatable in any appropriate manner.

While there are shown and described present preferred embodiments of the invention, it is to be distinctly understood that the invention is not limited thereto, but may be otherwise variously embodied and practiced within the scope of the following claims. Accordingly,

What we claim is:

1. A rolling apparatus comprising:
    a roll stand possessing two sides;
    a controlled deflection roll;
    said controlled deflection roll containing a non-rotatable support non-rotatably supported at said two sides of said roll stand and a roll shell which is rotatable about said non-rotatable support;
    said rotatable roll shell possessing a predetermined length and being support substantially along its length at said non-rotatable support;
    supporting means rotatably supporting said rotatable roll shell of said controlled deflection roll at said non-rotatable support thereof;
    at least one counter roll;
    said at least one counter roll containing a journal-less tubular shell;
    said roll shell and said journal-less tubular shell defining therebetween a roll nip of predeterminate extent;
    means mounting said at least one counter roll at said two sides of said roll stand;

said mounting means including supporting means pivotably supporting said journal-less tubular shell of said at least one counter roll;

said supporting means of said at least one counter roll constituting only two bearing supports pivotably supporting said journal-less tubular shell of said at least one counter roll within the predeterminate extent of said roll nip; and said two bearing supports pivotably supporting said journal-less tubular shell of said at least one counter roll and said supporting means supporting said rotatable roll shell of said controlled deflection roll at said non-rotatable support thereof being arranged at opposite sides of the roll nip in a mutually opposing relationship between said two sides of said roll stand.

2. The rolling apparatus as defined in claim 1, wherein:

said two bearing supports pivotably supporting said journal-less tubular shell of said at least one counter roll are arranged at a predetermined support distance from each other within said predeterminate extent of said roll nip;

said supporting means supporting said rotatable roll shell of said controlled deflection roll at said non-rotatable support thereof defining an effective support distance in said controlled deflection roll; and said predetermined support distance between said two bearing supports pivotably supporting said journal-less tubular shell of said at least one counter roll being of the same order of magnitude as said effective support distance in said controlled deflection roll.

3. The rolling apparatus as defined in claim 1, wherein:

said two bearings supports pivotably supporting said journal-less tubular shell of said at least one counter roll are arranged at a predetermined support distance from each other within said predeterminate extent of said roll nip;

said supporting means supporting said rotatable roll shell of said controlled deflection roll at said non-rotatable support thereof defining an effective support distance in said controlled deflection roll; and said predetermined support distance between said two bearing supports pivotably supporting said journal-less tubular shell of said at least one counter roll being smaller than said effective support distance in said controlled deflection roll.

4. The rolling apparatus as defined in claim 1, wherein:

said mounting means for said counter roll further including a support beam arranged within said at least one counter roll; and said support beam of said at least one counter roll being supported at said two sides of said roll stand.

5. The rolling apparatus as defined in claim 4, wherein:

said support beam of said at least one counter roll is non-rotatably supported at said two sides of said roll stand.

6. The rolling apparatus as defined in claim 5, wherein:

said mounting means further including bearing supports pivotably supporting said support beam of said at least one counter roll at said two sides of said roll stand.

7. The rolling apparatus as defined in claim 5, wherein:

said two bearing supports pivotably supporting said journal-less tubular shell of said at least one counter roll support said journal-less tubular shell at said non-rotatable support beam thereof within said predeterminate extent of said roll nip and constitute pivot bearings.

8. The rolling apparatus as defined in claim 4, wherein:

said tubular shell of said at least one counter roll constitutes a drivable tubular shell; and drive means drivingly connected to said tubular shell for rotation of said drivable tubular shell about said support beam of said at least one counter roll.

9. The rolling apparatus as defined in claim 4, wherein:

said mounting means further including roller bearings rotatably supporting said support beam of said at least one counter roll at said two sides of said roll stand.

10. The rolling apparatus as defined in claim 4, wherein:

said mounting means further including pivot bearings rotatably supporting said support beam of said at least one counter roll at said two sides of said roll stand.

11. The rolling apparatus as defined in claim 9, wherein:

said support beam of said at least one counter roll constitutes a drivable support beam; and drive means for rotatably driving said support beam of said at least one counter roll.

12. The rolling apparatus as defined in claim 9, further including:

an entrainment element provided between said tubular shell and said support beam of said at least one counter roll.

13. The rolling apparatus as defined in claim 2, wherein:

said two bearing supports pivotably supporting said journal-less tubular shell of said at least one counter roll and said supporting means supporting said rotatable roll shell of said controlled deflection roll at said non-rotatable support thereof are located in two common planes.

14. The rolling apparatus as defined in claim 1, further including:

two support members;

each one of said two support members extending inwardly from a related one of said two sides of said roll stand; and said two bearing supports pivotably supporting said journal-less tubular shell of said at least one counter roll within said predeterminate extent of said roll nip, constituting pivot bearings pivotably supporting said journal-less tubular shell of said at least one counter roll at said two support members extending inwardly from said two sides of said roll stand.

15. The rolling apparatus as defined in claim 14, further including:

a stabilizing rod interconnecting said two support members extending from said two sides of said roll stand.

16. The rolling apparatus as defined in claim 1, wherein:

a pressing direction is defined in the rolling apparatus;

said at least one counter roll defining a radial direction;

said tubular shell of said at least one counter roll defining a predetermined length; and said two bearings supports pivotably supporting said journal-less tubular shell of said at least one counter roll within said predeterminate extent of said roll nip such that said tubular shell is displaceable over said entire predetermined length thereof in said radial direction of said at least one counter roll at least in said pressing direction.

17. The rolling apparatus as defined in claim 1, wherein:

a pressing direction is defined in the rolling apparatus;

said supporting means rotatably supporting said rotatable roll shell at said non-rotatable support of said controlled deflection roll such that said rotatable roll shell is displaceable in its entirety over said predetermined length of said rotatable roll shell in said pressing direction;

said supporting means rotatably supporting said rotatable roll shell of said controlled deflection roll at said non-rotatable support thereof containing two outermost support elements; and an effective support distance being defined by the spacing between said two outermost support elements.

18. The rolling apparatus as defined in claim 1, wherein;

said two bearing supports pivotably supporting said journal-less tubular shell of said at least one counter roll within said predeterminate extent of said roll nip comprise pivot bearing means.

* * * * *